(No Model.)

C. F. HUBBARD.
BAKING OVEN.

No. 489,743.

5 Sheets—Sheet 1.

Patented Jan. 10, 1893.

Witnesses

J. Edw. Maybee
H. J. McMillan

Inventor

Chas. F. Hubbard
by Donald C. Ridout & Co.
Attys (No Model.) 5 Sheets—Sheet 3.

C. F. HUBBARD.
BAKING OVEN.

No. 489,743. Patented Jan. 10, 1893.

Witnesses
J. Edw. Maybee
H. G. McMillan

Inventor
Chas. F. Hubbard
by Donald C. Ridout & Co.
attys.

(No Model.)

C. F. HUBBARD.
BAKING OVEN.

No. 489,743.

5 Sheets—Sheet 4.

Patented Jan. 10, 1893.

Witnesses
J. Edw. Maybee
H. G. McMillan

Inventor
Chas. F. Hubbard
by Donald C. Ridout & Co.
attys.

THE NORRIS PETERS CO., PHOTO-LITHO., WASHINGTON, D. C.

(No Model.)  C. F. HUBBARD.  5 Sheets—Sheet 5.
BAKING OVEN.
No. 489,743.  Patented Jan. 10, 1893.
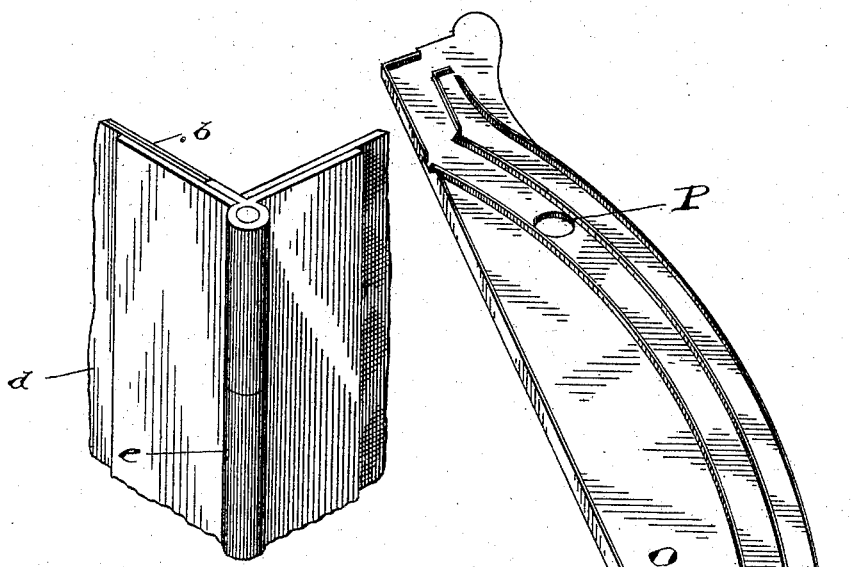
Fig. 6
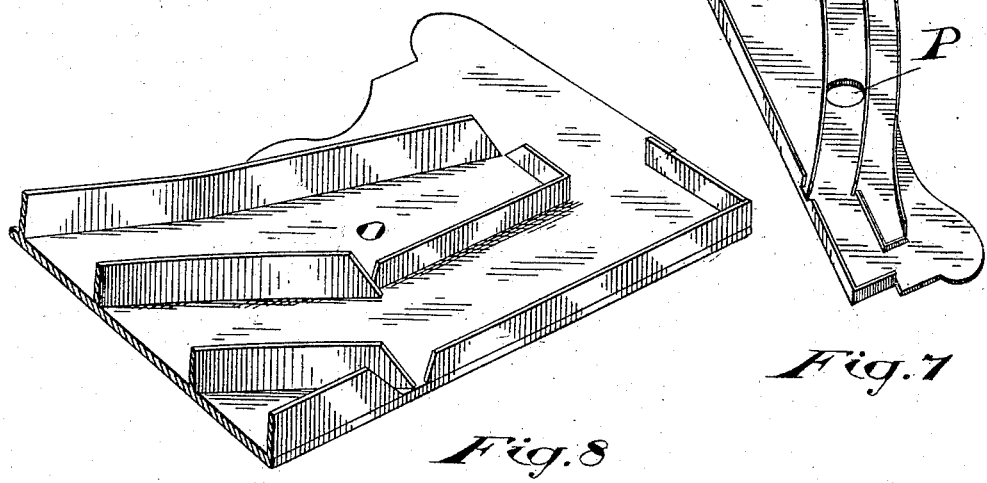
Fig. 8
Fig. 7
Witnesses  Inventor

United States Patent Office.

CHARLES FREDERICK HUBBARD, OF TORONTO, CANADA.

BAKING-OVEN.

SPECIFICATION forming part of Letters Patent No. 489,743, dated January 10, 1893.

Application filed January 21, 1892. Serial No. 418,815. (No model.)

*To all whom it may concern:*

Be it known that I, CHARLES FREDERICK HUBBARD, of the city of Toronto, in the county of York, in the Province of Ontario, Canada, have invented a certain new and useful Improvement in Baking-Ovens, of which the following is a specification.

The object of my invention is to design a baking oven in which a small fire shall be capable of heating a large oven at a uniform temperature, which temperature may be raised or lowered as occasion requires without interfering with the fire, the said oven to be constructed so that it may be readily taken apart for shipping purposes, and it consists, essentially, of the construction and arrangement of the parts hereinafter more particularly explained and then definitely claimed.

Figure 1:
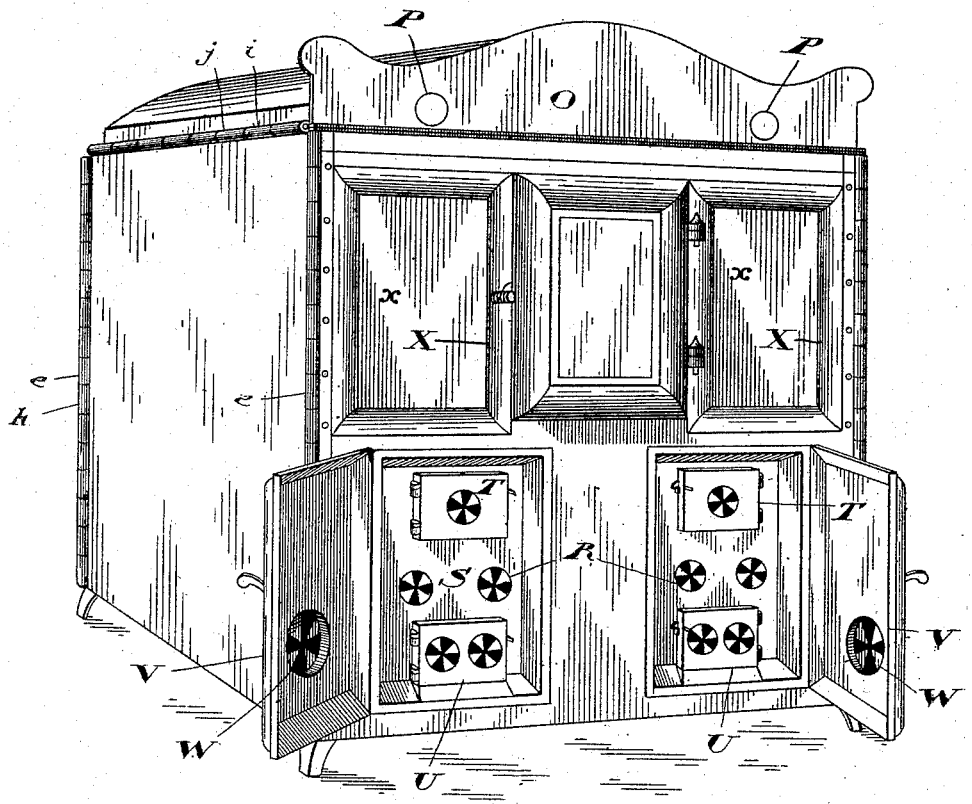
Figure 2:
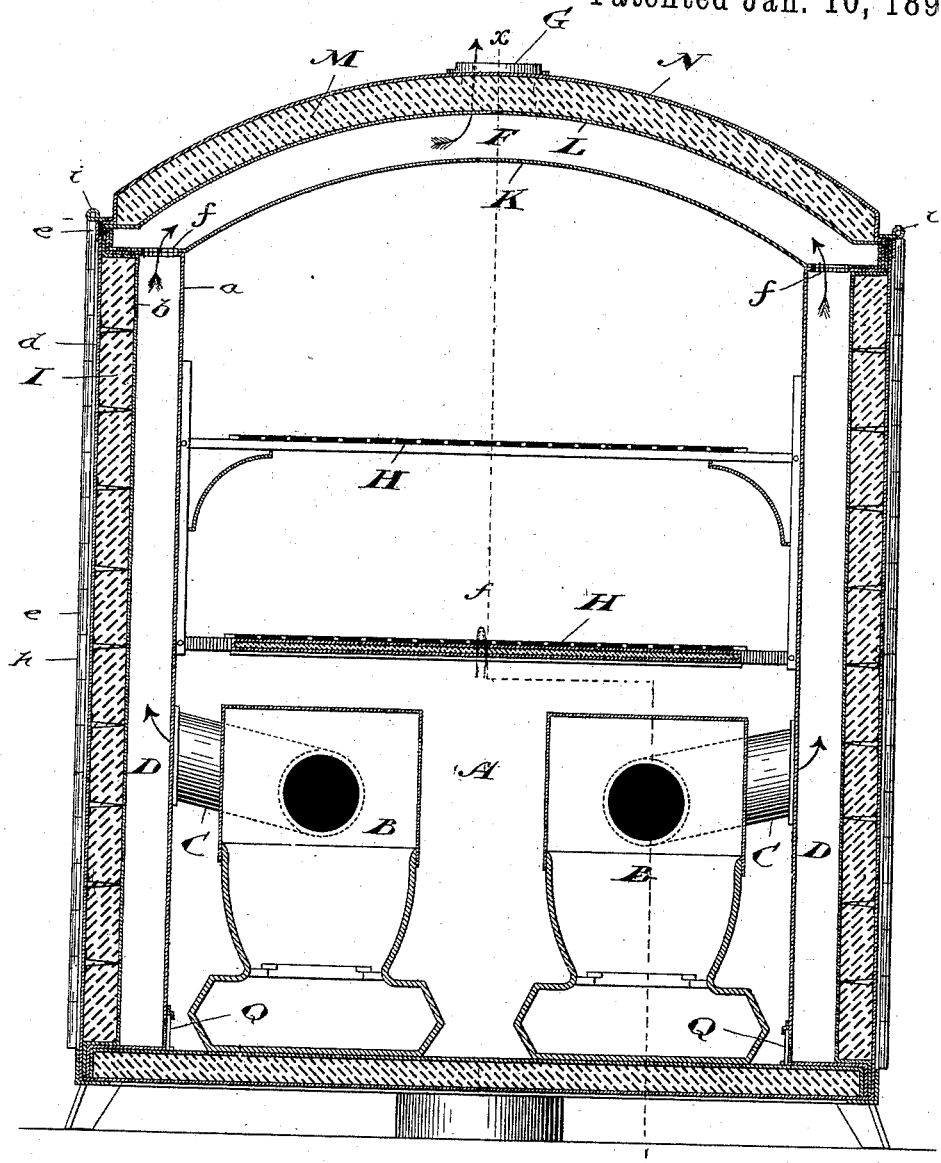
Figure 3:
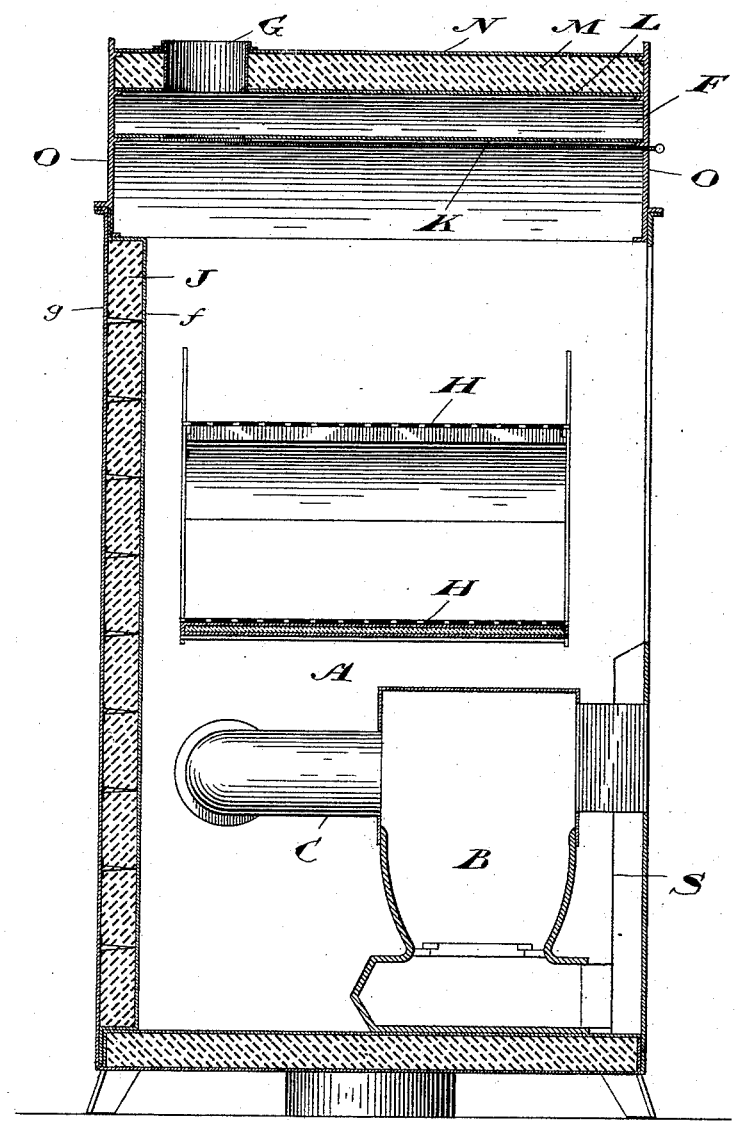
Figures 4, 5:
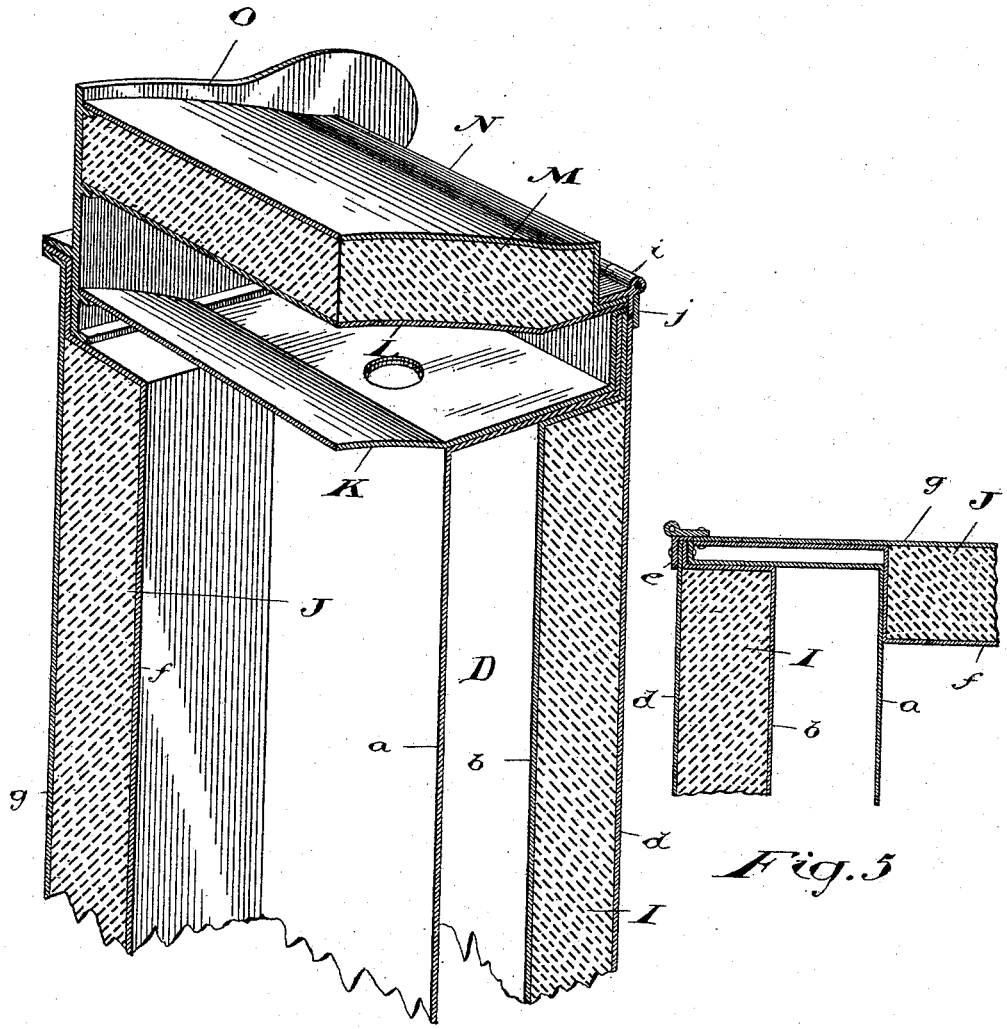

In the accompanying drawings Figure 1, is a perspective outside view of my improved oven. Fig. 2, is a sectional front elevation. Fig. 3, is a cross-section through X Y in Fig. 2. Fig. 4, is a sectional detail in perspective showing the manner of connecting the parts together forming the crown of the oven. Fig. 5, is a sectional plan of a corner, showing the connection between the back and side of the oven. Fig. 6, is an enlarged perspective detail, showing the means of connecting the two sides of the oven together. Fig. 7, is an enlarged perspective inside view of the end plate showing the ribs on which the plates forming the crown of the oven are supported. Fig. 8, is an enlarged perspective view of one end of Fig. 7.

Like letters of reference indicate corresponding parts in each figure.

Before describing the construction and arrangement of parts in detail, I shall first explain preferably the general idea of the oven involved in the invention.

A, represents the chamber, in which I place a stove or independent furnace B, which should be made preferably gas-tight and provided with a suitable smoke flue C, which connects directly with the air and smoke space D, which extends the full height and length of the compartment forming the oven.

In Fig. 2, I show two stoves or furnaces B, one for each air and smoke space D, on opposite sides of the compartment. Of course one stove might be arranged to connect with both air spaces, but I prefer two stoves as shown. The smoke and heated gases from the stove or stoves B, pass through the holes $f$ into the air and smoke space F, over the crown of the oven, thence out through the smoke flue G. The interior of the compartment forming the oven in this way not only gets the direct heat from the stove or stoves B, but also derives heat from both its sides and crown and consequently the oven is uniformly heated.

H, represents two shelves placed and suitably supported within the chamber A, above the stove or stoves B. The bottom of the lower shelf of these two is protected by a shield made of asbestos, mineral wool or other good non-conductor. In order to retain the heat within the oven so that the full benefit of the fire is secured, I surround the compartment or oven with an asbestos casing, and as a good portion of my invention is involved in its construction, I shall now proceed to describe in detail the manner in which I put the casing together.

Each air and smoke space D, has an inner sheet metal wall $a$, flanged at its top (see Figs. 2 and 4) to extend over and rest upon the flanged top of the sheet metal plate $b$, forming the other wall of the air and smoke space D, and also acting as an inner wall for the space I, which is filled with asbestos, mineral wool or other suitable non-conducting material. The outer wall of the space I, is a plain sheet metal plate $d$, having on its top and side edges a series of hinge-shaped eye-plates $e$, and $j$ riveted or otherwise fastened to it. With the view of strengthening the side formed by the walls $a$, and $d$, and also with the view of supporting the asbestos or other non-conductor held in the space, I form or secure to the inner side of the plate or wall $d$, a series of narrow plates which project through the asbestos and butt against the inner wall $a$, thereby bracing the two walls, and at the same time forming a series of supports which prevent the asbestos or its equivalent sinking to the bottom of the space. The back portion of the compartment or oven A, has also a space J, filled with asbestos, the said space being contained between the inner sheet metal plate $f$, and the outer sheet metal plate $g$, the sides of the outer sheet $g$, having a series of hinge-shaped eye-plates $h$, secured to them. These latter eye-plates $h$, are arranged to interlock with the eye-plates $e$, on the outer side plates $d$, so that the whole may be locked together by the insertion of a single bolt extending from the top to the bottom of the outer plates.

K, is a curved plate forming the crown of the oven. As will be seen on reference to Figs. 2 and 4, the curved crown of the plate K, extends from the top of one inner wall $a$, to the inner wall on the opposite side of the oven, the said plate K, being bent to rest upon the wall $a$. Both the said plates K, and $a$, together with the wall $b$, are bent upwardly to be parallel with the wall $d$, the whole of them being secured together by the bolts or rivets which hold the eye-plates $j$, in position. The curved plate K, forms one side of the air and smoke space F, while the curved plate L, forms the other side. This latter plate rests upon the flanged end of the plate K, as shown in Fig. 4, and forms one side of the space M, which is filled with asbestos, mineral wool or other non-conducting material. The outer wall of the space M, is formed of sheet metal N, which is shaped as shown in Figs. 2 and 4, and rests upon the plate L. A series of plates $i$, are riveted to the edge plate N, and are arranged to interlock with the eye-plates $j$, riveted to the top edge of the outer side plate $d$.

With the view of providing end supports for the curved plates K, L, and N, I provide for each end a ribbed plate O, (see Figs. 7 and 8) the said ribs being curved as shown to form supports for the plates K, L, and N. It will also be observed that between the ribs which support the curved plates K, and L, I make two or more apertures P, which are provided with suitable caps (not shown) and are intended to enable the air space F, to be cleaned out when required. It may be observed here that the curved or arched space F, greatly facilitates the draft, as the smoke and heated gases flow freely through it.

With the view of ventilating the chamber A, and producing a constant circulation, I make an opening or openings at the bottom of each air and smoke space D, and protect it by a damper Q. When these dampers are opened, a downward draft in the chamber A, will be produced, which chamber is supplied with fresh air through dampers R, made in the sunk portion S, of the front plate. The stove door T, and the ash door U, are both made in the same sunk portion S, and the whole is closed by an outer door V, which is provided with a single damper W. The oven doors X, are preferably provided with glass panels $x$, so that the process of cooking may be watched without opening the doors.

By placing a stove or furnace B, within the chamber A, constructed substantially as described and having an air inlet and an air outlet for admitting air into the chamber and discharging it from the chamber, I am enabled to regulate with accuracy and dispatch the temperature and circulation of the air through the oven and by surrounding the chamber A, with asbestos or other suitable non-conductor and arranging the smoke and air flues within it in the manner described I am able to secure to the fullest extent the effect of combustion within the stove or furnace and am therefore able to employ a very small stove or furnace for, comparatively speaking, a large chamber or oven.

Owing to the arrangement of the flues described and the means specified for heating the chamber A, anything placed in the oven to be baked is evenly affected on all sides by the action of the heated air and is therefore thoroughly cooked.

What I claim as my invention is:—

1. A chamber having its two outer sides, back and arched top lined with asbestos, mineral wool, or other suitable non-conductor, and within said lined sides an air and smoke space having an aperture through its top to communicate directly with an arched air space extending over the crown of the said chamber, a smoke pipe or flue extending from the arched air and smoke space, a stove or furnace contained within said chamber and having a smoke pipe to communicate with the side air and smoke space or spaces, substantially as and for the purpose specified.

2. A chamber having its two outer sides, back and arched top lined with asbestos, mineral wool, or other suitable non-conductor, and within said lined sides an air and smoke space having an aperture through its top to communicate directly with an arched air space extending over the crown of the said chamber, a smoke pipe or flue extending from the arched air and smoke space, a stove or furnace contained within said chamber and having a smoke pipe to communicate with the side air and smoke space or spaces, an aperture with suitable damper directly connecting the side air and smoke space and chamber near the bottom of the latter, and an aperture with suitable damper between the chamber and exterior thereof, substantially as and for the purpose specified.

3. A chamber or oven constructed substantially as described and having corresponding plates O, at its front and back with curved ribs formed thereon to support the ends of the plates K, and L, and N, substantially as and for the purpose specified.

4. In a baking oven of the character described, the plate O having cleaning-out holes and arched ribs, said ribs adapted to support the arched-shaped plates K, L and N to form the top of the oven, substantially as described.

Toronto, January 9, 1892.

CHARLES FREDERICK HUBBARD.

In presence of—
 I. EDW. MAYBEE,
 W. G. MCMILLAN.